United States Patent
Loeffler

(10) Patent No.: US 11,755,696 B1
(45) Date of Patent: Sep. 12, 2023

(54) SYSTEM FOR DELIVERING DIGITAL MEDIA TO CONSUMERS

(71) Applicant: Nicholas Patton Loeffler, New York City, NY (US)

(72) Inventor: Nicholas Patton Loeffler, New York City, NY (US)

( * ) Notice: Subject to any disclaimer, the term of this patent is extended or adjusted under 35 U.S.C. 154(b) by 0 days.

(21) Appl. No.: 17/690,636

(22) Filed: Mar. 9, 2022

(51) Int. Cl.
*G06F 21/16* (2013.01)

(52) U.S. Cl.
CPC ...... *G06F 21/16* (2013.01); *G06F 2221/0766* (2013.01)

(58) Field of Classification Search
CPC .......... G06F 21/16; G06F 21/00; G06F 21/10; G06F 2221/0766; H04N 1/32
See application file for complete search history.

(56) References Cited

U.S. PATENT DOCUMENTS

| | | | |
|---|---|---|---|
| 7,343,320 B1 | 3/2008 | Treyz | |
| 8,041,612 B1 | 10/2011 | Treyz | |
| 8,332,281 B2 | 12/2012 | Smith | |
| 8,489,510 B1 | 7/2013 | Craine | |
| 8,826,459 B2 * | 9/2014 | Swist | G06F 21/10 |
| | | | 711/163 |
| 8,831,275 B2 | 9/2014 | Goldberg | |
| 9,582,794 B2 | 2/2017 | Kearney | |
| 9,846,767 B2 * | 12/2017 | Britt, Jr. | G11B 20/00869 |
| 10,977,298 B2 * | 4/2021 | Adams | G06F 21/16 |
| 2002/0147661 A1 | 10/2002 | Hatakana | |
| 2009/0037605 A1 | 2/2009 | Li | |
| 2009/0257091 A1 | 10/2009 | Shelton | |
| 2012/0311723 A1 * | 12/2012 | Britt, Jr. | G06F 16/43 |
| | | | 726/28 |
| 2013/0307998 A1 | 11/2013 | Tautenhahn | |
| 2014/0289754 A1 * | 9/2014 | Riethmueller | H04N 21/44226 |
| | | | 725/19 |
| 2017/0237867 A1 | 8/2017 | Treyz | |
| 2019/0087889 A1 | 3/2019 | Rice | |

* cited by examiner

*Primary Examiner* — Hosuk Song
(74) *Attorney, Agent, or Firm* — LOEFFLER IP GROUP, P.A.; Bryan L. Loeffler, Esq.

(57) ABSTRACT

A system for managing and facilitating the preview, sale and transfer of digital media files, such as digital photographs and/or digital videos, preferably through text messaging that provides streamlined transactions between photographers and/or videographers and purchasers of digital media files.

3 Claims, 4 Drawing Sheets

SYSTEM FOR DELIVERING DIGITAL MEDIA TO CONSUMERS

FIELD OF THE INVENTION

The present invention relates to transaction management systems. More particularly, the invention relates to methods and systems for managing and facilitating the preview, sale and transfer of digital media, such as digital photographs and/or videos, via mobile electronic devices.

BACKGROUND OF THE INVENTION

Professional photographers and/or videographers are typically hired to take photographs and/or videos of events and/or special occasions, such as weddings, graduations, family gatherings and so forth. Professional photographers and/or videographers also may earn a living by taking photographs to be used in media, such as in news stories, advertising, stock photographs and so forth.

In almost all of these situations, time is of the essence to induce the buyer to purchase one or more photos and/or videos. However, conventional photo and video delivery systems require the use of Internet access and webpages and/or disjointed message delivery systems that are difficult to navigate and use on portable electronic devices, such as smart phones especially by photographers and/or videographers who typically work out in the field.

Therefore, a need exists for a system for managing and facilitating the preview, sale and transfer of digital media, such as digital photographs and/or videos, that is carried out through the use of smart phones and similar portable electronic devices.

SUMMARY OF THE INVENTION

The primary object of the present invention is to provide a system for managing and facilitating the preview, sale and transfer of media, such as digital photographs and/or videos, through text messaging that provides streamlined transactions between photographers and purchasers of digital photos.

The present invention fulfills the above and other objects by providing a system that allows photographers and/or videographers to select one or more digital media files, such as digital images and/or digital videos, stored on an electronic device and watermark the selected photographs locally on the electronic device.

For example, with regard to digital photographs, the watermarked photographs and corresponding unaltered original photographs are then uploaded to an online storage area or database. The photographer may then send a message, such as a text message, to a customer wherein one or more watermarked photographs are provided therein. The customer may then select one or more of the provided watermarked photographs for purchase and enter payment information via a link to a payment portal provided in the message. After payment is verified, corresponding original photographs having no watermarks are sent from the online storage area to the customer's electronic device via text message and/or email.

The system of the present invention may also be applied to videos wherein a videographer may select one or more digital videos stored on an electronic device and watermark the selected videos locally on the electronic device. The watermarked videos and corresponding unaltered original videos are then uploaded to an online storage area or database. The videographer may then send a message, such as a text message, to a customer wherein one or more watermarked videos are provided therein. The customer may then select one or more of the provided watermarked videos for purchase and enter payment information via a link to a payment portal provided in the message. After payment is verified, corresponding original videos having no watermarks are sent from the online storage area to the customer's electronic device via text message and/or email.

Another feature of the invention allows the photographer or videographer to set up a kiosk at an event so attendees can view watermarked videos and/or photos in a gallery on the kiosk and order one or more watermarked videos and/or photos. In such a situation, the kiosk, which is an electronic device, allows the customer to select one or more of the provided watermarked videos or photos (which are watermarked on a local device) for purchase and enter payment information via a link to a payment portal provided in the message. After payment is verified, corresponding original videos having no watermarks are sent from the online storage area to the customer's electronic device via text message and/or email.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
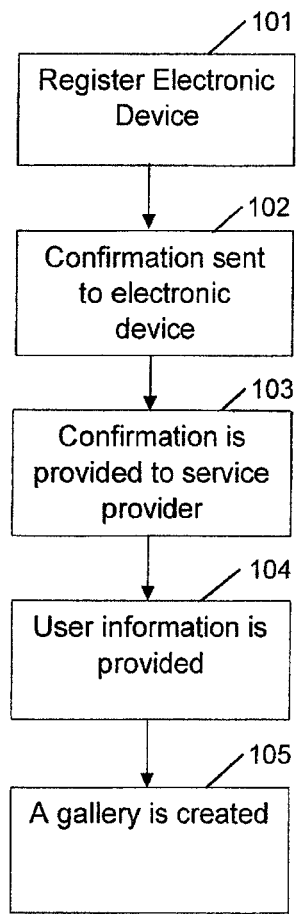
FIG. 1 is a flow chart showing the steps for registering an electronic device using the system of the present invention.

With reference to FIG. 1, a flow chart showing the steps for registering an electronic device using the system of the present invention is illustrated. First, an electronic device is registered by visiting a service provider's website and entering a phone number 101. Then, a confirmation is sent to an electronic device having the provided phone number via a text message with a confirmation code 102. Next, the confirmation code is entered into the service provider's website 103. Then, user contact information, such as name, email address, social tag, personal photo, address, and so forth is entered into the service provider's website to create a profile linked to the photographer's electronic device 104. Next, at least one gallery is created connected to the photographer's profile in which digital media files, such as digital photos, digital videos and so forth, are uploaded by the photographer using the system of the present invention are displayed 105. The term photographer may be used interchangeably for a videographer or an individual creating digital media files on a local electronic device.

Figure 2:
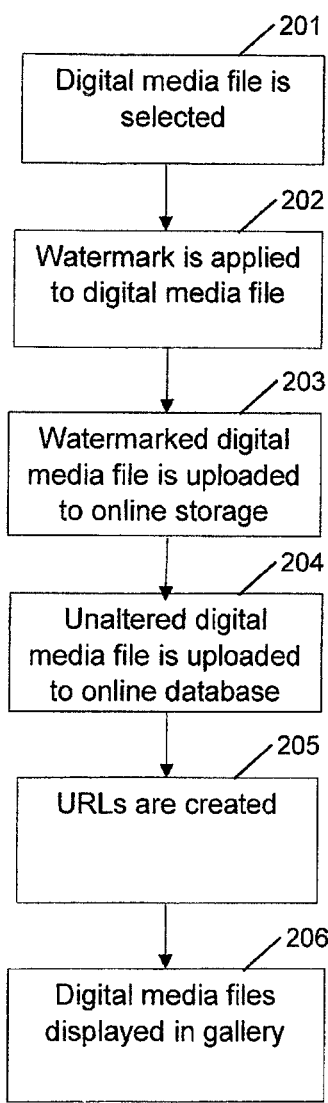
FIG. 2 is a flow chart showing the steps for watermarking one or more digital photographs and then storing the one or more watermarked digital photographs using the system of the present invention.

With reference to FIG. 2, a flow chart showing the steps for watermarking one or more digital media files, such as a digital photo or digital video, and then storing the one or more digital media files using the system of the present invention is illustrated. First, a digital media file is selected from the photographer's storage on the photographer's local electronic device, such as a digital camera, smart phone, tablet or so forth 201. Then, a watermark or equivalent identifying pattern is integrated into the digital media file on the local electronic device 202. Next, the watermarked digital media file is uploaded to an online storage database, such as an S3 bucket or equivalent cloud storage, that is linked to the photographer's registered electronic device and/or profile and a URL is created for the watermarked digital media file 203. Then, an unaltered copy of the digital media file is uploaded to the online storage database and a URL is created for the unaltered digital media file 204. Then, the URL for the watermarked digital media file and the URL for the unaltered digital media file are sent to a server controlled by the service provider 205. Next, the watermarked digital media file is displayed in the photographer's gallery 206.

Figure 3:
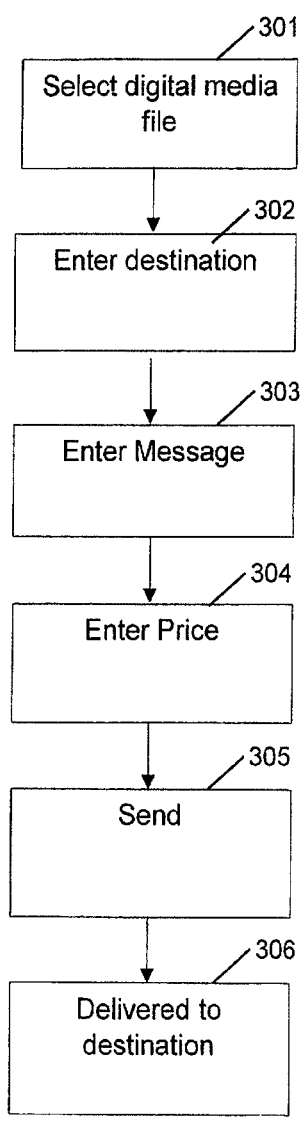
FIG. 3 is a flow chart showing the steps for sending one or more watermarked photographs to a purchaser's electronic device using the system of the present invention.

With reference to FIG. 3, a flow chart showing the steps for sending one or more watermarked digital media file to a purchaser's electronic device using the system of the present invention is illustrated. First, the photographer selects at least one uploaded digital media file from his or her gallery using the registered electronic device or by logging in to his or her profile 301. Then, the photographer enters a phone number or email of a purchaser 302. Next, the photographer may enter a message to the purchaser 303. Then, the photographer may enter a price he or she is charging for each of the at least one digital media file 304. Next, the photographer sends a text message, which includes the one or more watermarked digital media files to the purchaser which includes the message and price per digital media file 305. The one or more watermarked digital media file are sent via text, such as an SMS/MMS message wherein the link may comprise an SMS ID 306.

Figure 4:
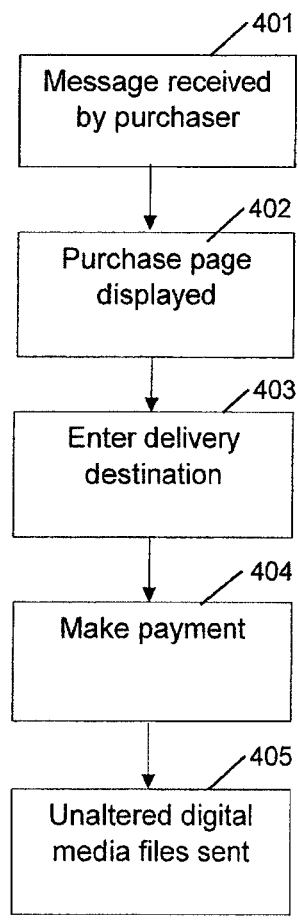
FIG. 4 is a flow chart showing the steps for purchasing and receiving non-watermarked photographs on the purchaser's electronic device using the system of the present invention.

With reference to FIG. 4, a flow chart showing the steps for purchasing and receiving non-watermarked digital media file on the purchaser's electronic device using the system of the present invention. After receiving one or more watermarked digital media file via text, such as an SMS/MMS message, with a link to purchase the one or more digital media file from the photographer, the purchaser may click on the link in the SMS/MMS message which contains an SMS ID that is specific to and identifies the transaction between the photographer and the purchaser 401. Then, then the server displays a purchase page on the purchaser's electronic device displaying the at least one watermarked digital media file previously selected by the photographer, the price per digital media file previously selected by the photographer 402. Next, the purchaser may select one or more of the at least one watermarked digital media files for purchase, thereby adding the selected one or more watermarked digital media files to a shopping cart 403. Then, the purchaser may enter a delivery destination, such as a phone number or email, to which the purchaser wants the purchased unaltered digital media files sent 404. Next, the purchaser clicks a checkout button or equivalent and is directed to a payment page, which is preferably an external payment site 404. After payment is made through the payment page, confirmation is sent to the service provider and the unaltered digital media files corresponding to the selected watermarked digital media files are sent from the online storage database, such as an S3 bucket or equivalent cloud storage, via text and/or email to the purchaser's one or more selected delivery destinations 405.

Figure 5:
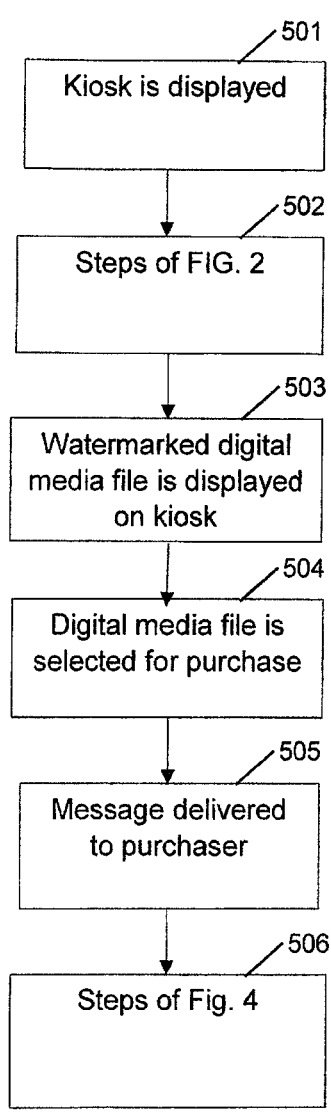
FIG. 5 is a flow chart showing the steps for displaying, purchasing and delivering digital media files through a kiosk using the system of the present invention.

With reference to FIG. 5, a flow chart showing the steps for displaying, purchasing and delivering digital media files through a kiosk using the system of the present invention is illustrated. First, an electronic device, such as a tablet or other electronic display is set up at an event, such as a wedding or other gathering 501. The digital media files may be watermarked locally on the electronic device of the kiosk and/or on the photographer's local electronic device following the steps illustrated in FIG. 2 wherein the watermarked digital media file is uploaded to an online storage database, such as an S3 bucket or equivalent cloud storage, that is linked to the photographer's registered electronic device and/or profile and a URL is created for the watermarked digital media file and an unaltered copy of the digital media file is uploaded to the online storage database and a URL is created for the unaltered digital media file 502. The watermarked digital media files are then displayed on the kiosk 503. Next using the kiosk, the purchaser may select one or more of the at least one watermarked digital media files for purchase, thereby adding the selected one or more watermarked digital media files to a shopping cart 504. Then, the purchaser may enter a delivery destination, such as a phone number or email, to which the purchaser wants the purchased unaltered digital media files sent 505. Next, the purchaser completes the transaction by carrying out the steps illustrated in FIG. 4 506.

Figure 6:
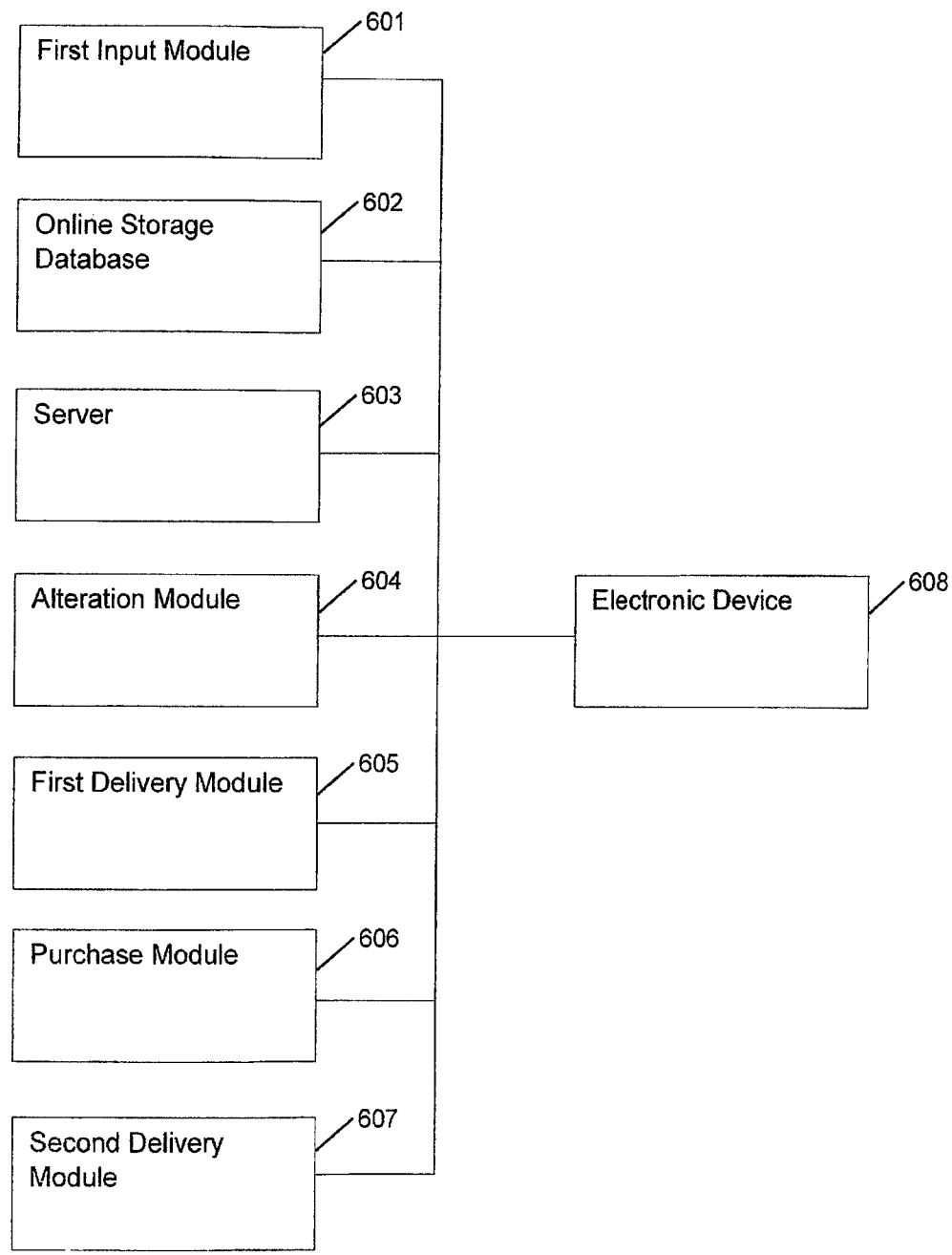
FIG. 6 is a block diagram showing modules for performing the steps embodied in the system of the present invention.

With reference to FIG. 6, a block diagram showing modules and components for performing the steps embodied in the system of the present invention is illustrated. The present invention comprises a first input module 601 for registering a user, such as a photographer or videographer, with a service provider and creating an account with said service provider. An online storage database 602 provides storage for at least one altered or watermarked digital media file and at least one unaltered corresponding digital media file. A server 603 for disseminating and/or displaying one or more URLs that link to the at least one altered or watermarked digital media file and the at least one unaltered corresponding digital media file. An alteration module 604 that allows a photographer to alter or watermark at least one digital media file locally on an electronic device. A first delivery module 605 that allows the at least one altered or watermarked digital media file to be sent from the online storage database to an electronic device, such as a purchaser's smart phone, a display kiosk and so forth, for display to a purchaser. A purchase module 606 that allows a purchaser to pay for the at least one unaltered digital media file. A second delivery module 607 for delivering the at least one unaltered digital media file from the online storage database to the purchaser. Said modules and components being connected to at least one electronic device 608.

Figure 7:
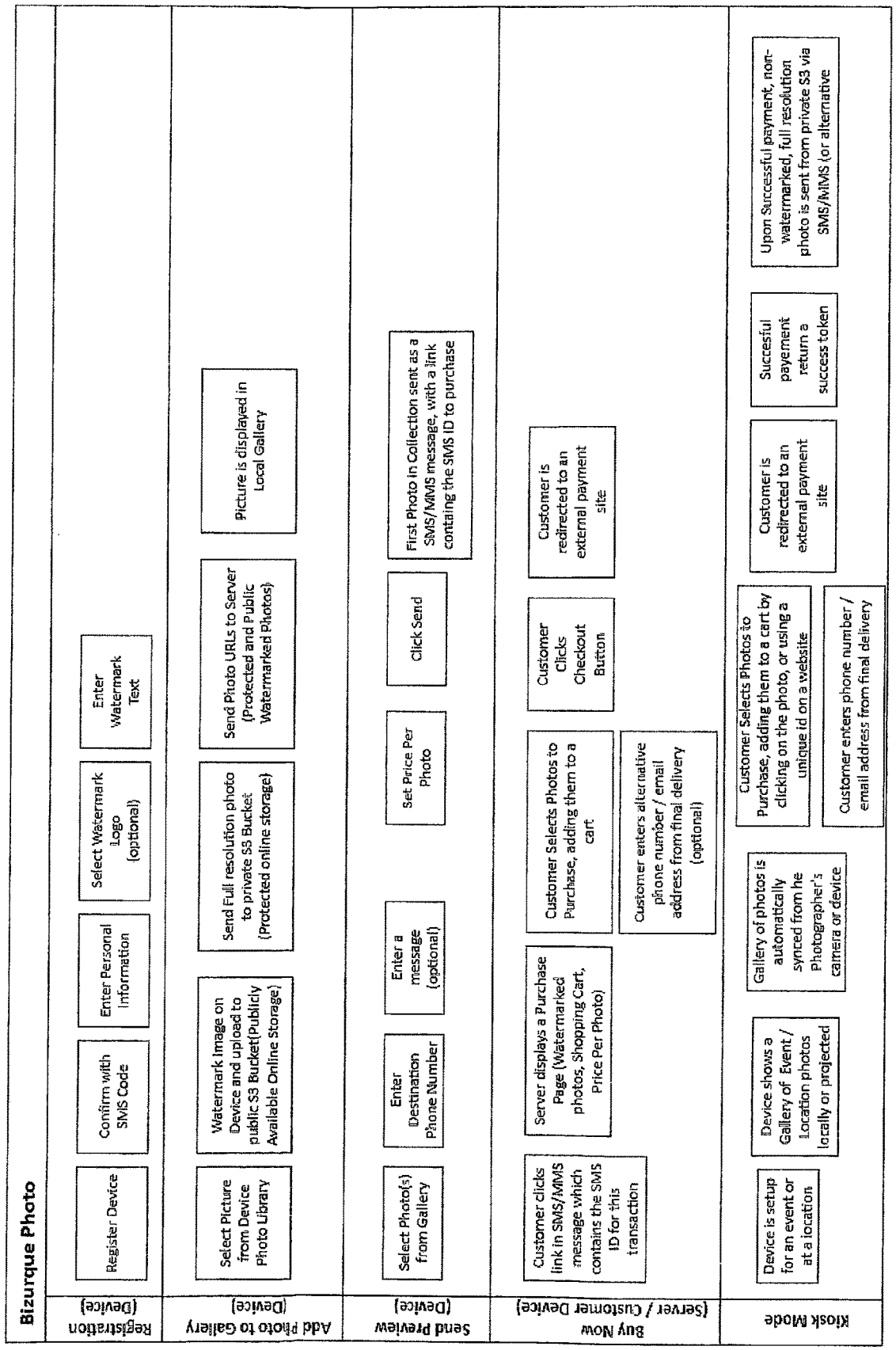
FIG. 7 is an overview of the system of the present invention.

With reference to FIG. 7, an overview of the system of the present invention is illustrated.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A system comprising:
   a service provider network being communicatively coupled to a first electronic device, a second electronic device, and an online storage database;
   the first electronic device having at least one original digital media file taken using the first electronic device stored locally on the first electronic device;
   the first electronic device being capable of creating a copy of a selected digital media file from the at least one original digital media file via said service provider network;
   the first electronic device being capable of integrating a watermark into the copy of the selected digital media file via said service provider network;
   the first electronic device capable of uploading the selected digital image having a watermark integrated therein to the online storage database via said service provider network;
   said selected digital media file having a watermark integrated therein being transmitted to said second electronic device from said service provider network via a text message;
   said second electronic device being capable of transacting a purchase of the first selected digital media file uploaded to the online storage database via said service provider network;
   said selected digital media file having no watermark integrated therein being transmitted to said second electronic device from said service provider network via a text message created by service provider after a purchase of the selected digital media file has occurred; and
   a URL linking to said selected digital media file having no watermark integrated therein being created and transmitted to said second electronic device from said service provider network via a text message created by service provider.

2. The system of claim 1 wherein:
   said online storage is an S3 bucket.

3. The system of claim 1 wherein:
   said online storage is an online cloud storage.

* * * * *